Sept. 7, 1943.                W. M. COCKBURN                  2,328,616
                              PROJECTING DEVICE
                    Filed Sept. 11, 1940           2 Sheets-Sheet 1
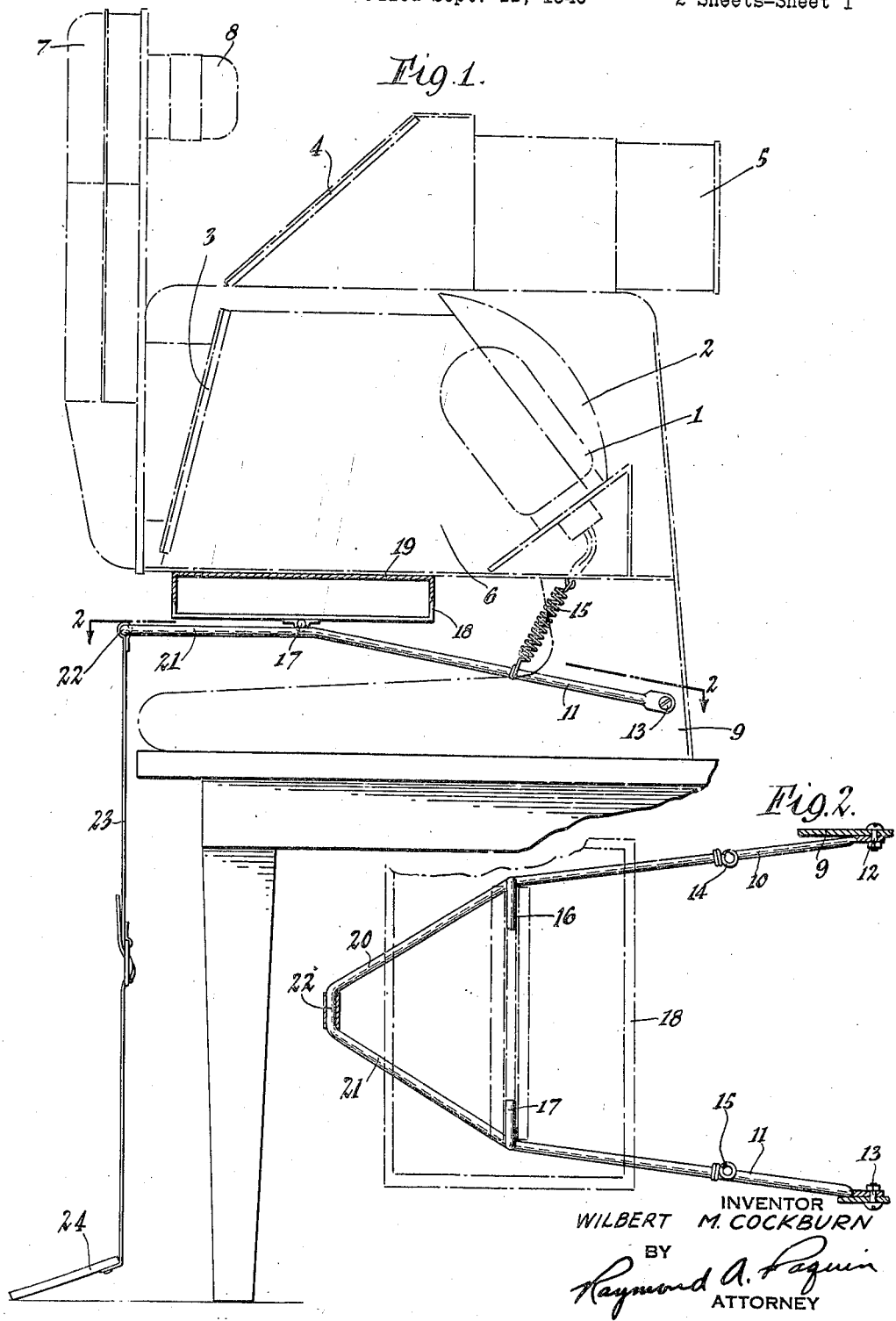
INVENTOR
WILBERT M. COCKBURN
BY
Raymond A. Paquin
ATTORNEY Sept. 7, 1943. W. M. COCKBURN 2,328,616
PROJECTING DEVICE
Filed Sept. 11, 1940 2 Sheets-Sheet 2
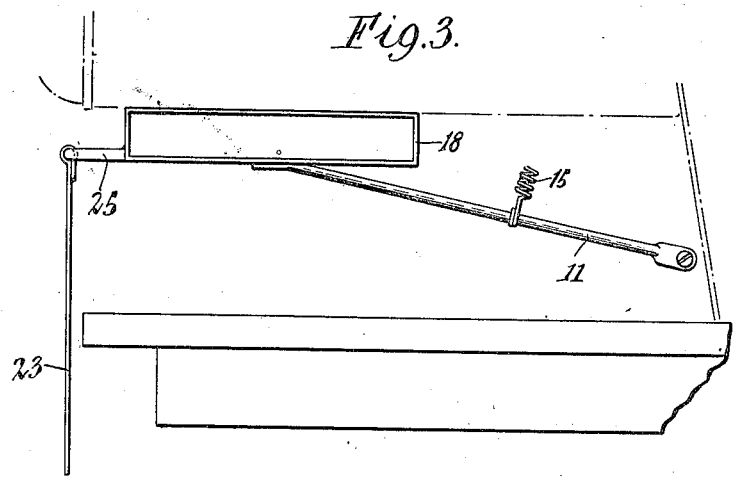
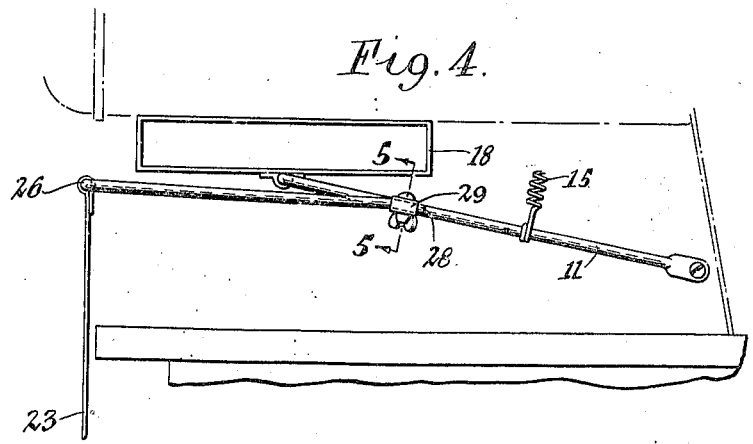
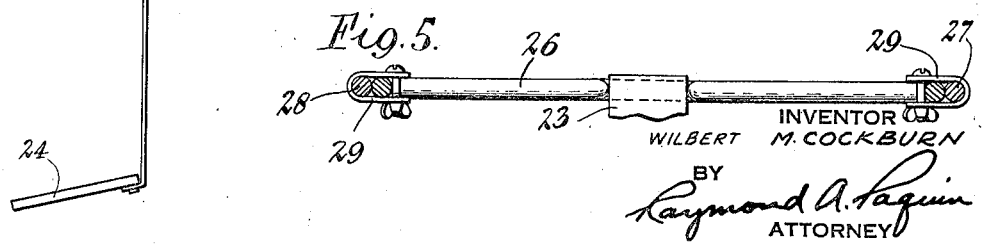
INVENTOR
WILBERT M. COCKBURN
BY
Raymond A. Paquin
ATTORNEY Patented Sept. 7, 1943

2,328,616

UNITED STATES PATENT OFFICE 2,328,616

PROJECTING DEVICE

Wilbert M. Cockburn, Newmarket, Ontario, Canada, assignor to Spencer Lens Company, Buffalo, N. Y., a corporation of New York Application September 11, 1940, Serial No. 356,335

8 Claims. (Cl. 88—24)

This invention relates to projectors and particularly to new and improved means for operating the platen of projectors adapted for the projection of opaque material.

An object of the invention is to provide new and improved means for controlling the operation of the platen of a projector whereby the platen may be operated by the foot of the operator, leaving the hands free for the insertion or removal of material.

Another object of the invention is to provide new and improved means for operating the platen of a projector which may be easily attached to the various types of projectors now in use.

Another object of the invention is to provide new and improved means for operating the platen of a projector, whereby the platen may be lowered with its sides parallel, so that the edges of the material to be projected will be flat and even with each other for better projection.

Another object of the invention is to provide new and improved operating means for the platen of a projector which operating means is in the rear of the projector thereby giving ready and free access to said platen for inserting or removing material to be projected.

Another object of the invention is to provide an adjustable foot treadle arrangement for the operation of the platen of a projector for use in projecting opaque materials, wherein the platen may be operated on tables of various heights.

Other objects and advantages of the invention will become apparent from the following description taken in connection with the accompanying drawings. It will be apparent that many changes in the details of construction and arrangement of parts may be made without departing from the scope of the invention as expressed in the accompanying claims in view of which it is desired not to limit the invention to the exact details shown and described, as the preferred forms have been shown by way of illustration only.

Referring to the drawings:

Fig. 1 is a side view of an opaque projector partly in section showing the platen operating mechanism;

Fig. 2 is a sectional view taken along line 2—2 of Fig. 1 looking in the direction of the arrows;

Fig. 3 is a side view of a modified form of the platen operating device;

Fig. 4 is a side view of a further modified form of the platen device; and

Fig. 5 is a sectional view taken on line 5—5 of Fig. 4.

In the drawings, wherein similar reference characters designate corresponding parts throughout the several views, there is shown an opaque projector comprising a lamp or source of illumination 1, a reflector 2 positioned behind the said lamp 1, mirrors 3 and 4 adapted to reflect the material being projected through the objective lens system 5 onto a screen or the like. Each of the sides 6 of the projector is also preferably provided with a mirror for reflecting the material to be projected as described in connection with the mirror 3.

There is also provided a blower unit 7 having the motor 8 adapted to blow a stream of air over the material being projected to prevent its being damaged from heat from the light source.

The projector has the base 9 adapted to rest on a table or the like to support the projector in operable position. Between the base 9 and the body of the projector is a space or opening in which is positioned the platen which is the device for positioning the material to be projected in operable association with the remainder of the projector.

The platen arrangement shown in Figs. 1 and 2 comprises the arms 10 and 11 pivoted to the base 9 of the projector at 12 and 13 respectively and resiliently connected to the body of the projector by means of the coil springs 14 and 15.

The said arms 10 and 11 have the projections 16 and 17 adapted to fit into the slots on either end respectively of the base of the platen 18, which platen is provided with the upper portion 19 adapted to support the material to be projected, which material is adapted to be held flat between said portion 19 of the platen 18 and the base plate of the projector housing.

The arms 10 and 11 are also provided with the extending portions 20 and 21 terminating in a connecting portion 22. These extension portions 20 and 21 are so formed that they extend rearwardly of the back edge of the base 9 of the projector and extend thereover and the member 23 is adjustably connected to said portion 22. The member 23 is preferably a belt or the like having a buckle for longitudinal adjustment and is connected at its opposite end to a member 24 adapted to be used as a foot treadle.

When the projector is placed upon a table the belt 23 is adjusted to desired length, that is, so that the forward end of the foot treadle 24 is a short distance above the floor so that when the operator steps upon the treadle or pushes it down with his foot, the movement of the treadle 24 and belt 23 pulls the brackets 20 and 21 down likewise which causes the platen 18 to be also lowered to allow insertion or removal of the material to be projected. This construction allows the platen to be entirely controlled by the foot of the operator, leaving the hands free for insertion or removal of the material.

It will be apparent that instead of employing the belt or strap 23 it is possible to use various other structures as, for example, a wire or cable having a turn-buckle for longitudinal adjustment or other similar means.

In the form shown in Fig. 3 the construction is generally similar to that shown in Figs. 1 and 2 except that the platen 18 is rigidly connected to the arms 10 and 11 instead of pivotally associated as described in connection with Figs. 1 and 2. In this case the member 25 is secured directly to the rear edge of the platen 18 instead of employing the auxiliary brackets 20 and 21. The belt 23 is then connected to this bracket 25 in a similar manner to that outlined above.

It will also be apparent that if desired, the platen control can be constructed in the manner shown in Fig. 3 without employing the member 23. In such a construction the platen would be operated by pulling down the bracket 25 with the hand.

In Figs. 4 and 5 is shown a construction in which the brackets 20 and 21 are made detachable in order that they may be secured to the arms 10 and 11 or any platen supports or projectors now in use.

In such a construction the auxiliary member 26 is formed separate and then has each of its ends 27 and 28 secured to one of the brackets 10 and 11 respectively by means of the clamp arrangement 29, as shown in detail in Fig. 5.

With such a construction it is possible for persons now owning projectors of the type set forth to purchase merely this attachment with the belt 23 and foot treadle 24 and they may easily and quickly attach the same to their present projector. This is a simple and inexpensive attachment which will greatly increase the efficiency and operation of their present projector.

From the foregoing it will be seen that I have provided simple, efficient and economical means of obtaining all of the objects and advantages of the invention.

Having described my invention, I claim:

1. In a device of the character described, a casing, a source of illumination and a reflector in said casing, a projection lens system on said casing in optical alignment with said source of illumination and said reflector, an opening in a wall of said casing, a platen adapted to overlie said opening and support the material to be projected in alignment therewith, resilient means normally urging said platen toward said opening, a pivoted support for said platen, said support having a portion extending rearwardly of said platen and of said casing, a foot operated member and a longitudinally adjustable member connected at one end to said foot operated member and at its other end to the rearwardly extending portion of said platen support whereby movement of said foot operated member will cause movement of said platen away from the opening in the casing.

2. In a device of the character described, a base, a casing supported on said base, a source of illumination and a reflector in said casing, a projection lens system on said casing in optical alignment with said source of illumination and said reflector, an opening in the lower side of said casing, a platen adapted to overlie said opening and to support the material to be projected in alignment therewith, resilient means normally urging said platen toward said opening, a support for said platen, said support being pivotally connected to said base and having a portion extending rearwardly of said platen and base, a foot operated member and a member connected at one end to said foot operated member and at its other end to the rearwardly extending portion of said platen support whereby movement of said foot operated member will cause movement of said platen away from the opening in the casing.

3. In a device of the character described, a base, a casing supported on said base, a source of illumination and a reflector in said casing, a projection lens system on said casing in optical alignment with said source of illumination and said reflector, an opening in the lower side of said casing, a platen adapted to overlie said opening and to support the material to be projected in alignment therewith, resilient means normally urging said platen toward said opening, a substantially U-shaped support for said platen, said support being pivotally connected at its forward ends to said base and having a portion extending rearwardly of said platen and base, a foot operated member and a member connected at one end to said foot operated member and at its other end to the rearwardly extending portion of said platen support whereby movement of said foot operated member will cause movement of said platen away from the opening of the casing.

4. In a device of the character described, a base, a casing supported on said base, a source of illumination and a reflector in said casing, a projection lens system on said casing in optical alignment with said source of illumination and said reflector, an opening in the lower side of said casing, a platen adapted to overlie said opening and to support the material to be projected in alignment therewith, resilient means normally urging said platen toward said opening, a substantially U-shaped support for said platen, each arm of said support being pivotally connected to opposite sides of said base and each having means thereon for forming a pivotal connection for pivotally mounting said platen on its support, a portion of said U-shaped support extending outwardly of said base, a foot operated member, and means connected at one end to said foot operated member and at its other end to the outwardly extending portion of said U-shaped platen support.

5. In a device of the character described, a casing, a source of illumination and a reflector in said casing, a projection lens system on said casing in optical alignment with said source of illumination and said reflector, an opening in a wall of said casing, a platen adapted to overlie said opening and support the material to be projected in alignment therewith, resilient means normally urging said platen toward said opening, a support for said platen, said support having a portion extending rearwardly of said platen and of said casing, a foot operated member and a member connected at one end to said foot operated member and at its other end to the rearwardly extending portion of said platen support whereby movement of said foot operated member will cause movement of said platen away from the opening in the casing.

6. In a device of the character described, a base, a casing supported on said base, a source of illumination and a reflector in said casing, a projection lens system on said casing in optical alignment with said source of illumination and said reflector, an opening in a wall of said casing, a platen adapted to overlie said opening and to support the material to be projected in alignment therewith, means normally urging said platen toward said opening, a support for said platen, said platen support being pivotally connected and having a portion extending rearwardly of said platen and base, a foot operated member and a member connected at one end to said foot operated member and at its other end to the rearwardly extending portion of said platen support whereby movement of said foot operated member will cause movement of said platen away from the opening in said casing.

7. In a device of the character described, a case, a source of illumination and a reflector in said casing, a projection lens system on said casing in optical alignment with said source of illumination and said reflector, an opening in a wall of said casing, a platen adapted to overlie said opening and support the material to be projected in alignment therewith, means normally urging said platen toward said opening, a support for said platen, means secured at one end to said platen and extending outwardly therefrom, a foot operated member and a member connected at one end to said foot operated member and at its other end to said outwardly extending means whereby movement of said foot operated member will cause movement of said platen away from the opening in the casing.

8. In a device of the character described for use with a projector having a casing, a source of illumination and a reflector in said casing, a projection lens system on said casing in optical alignment with said source of illumination and said reflector, an opening in a wall of said casing, a platen adapted to overlie said opening and support the material to be projected in alignment therewith, means normally urging said platen toward said opening, said device comprising a support for said platen, said support having a portion extending rearwardly of said platen, a foot operated member and a member connected at one end to said foot operated member and at its other end to the rearwardly extending portion of said platen support whereby movement of said foot operated member will cause movement of said platen away from the opening in the casing.

WILBERT M. COCKBURN.